United States Patent
Borate et al.

(10) Patent No.: US 11,940,880 B2
(45) Date of Patent: Mar. 26, 2024

(54) FOLDER SCAN SYSTEM AND METHOD FOR INCREMENTAL BACKUP

(71) Applicant: Druva Inc., Sunnyvale, CA (US)

(72) Inventors: Milind Vithal Borate, Pune (IN); Sudhakar Paulzagade, Pune (IN)

(73) Assignee: Druva Inc., Santa Clara, CA (US)

(*) Notice: Subject to any disclaimer, the term of this patent is extended or adjusted under 35 U.S.C. 154(b) by 0 days.

(21) Appl. No.: 17/546,796

(22) Filed: Dec. 9, 2021

(65) Prior Publication Data
US 2023/0121247 A1    Apr. 20, 2023

(30) Foreign Application Priority Data
Oct. 1, 2021 (IN) .............................. 202141044665

(51) Int. Cl.
*G06F 11/14*    (2006.01)
(52) U.S. Cl.
CPC ...... *G06F 11/1451* (2013.01); *G06F 11/1435* (2013.01); *G06F 11/1461* (2013.01); *G06F 11/1464* (2013.01); *G06F 11/1469* (2013.01)

(58) Field of Classification Search
CPC ............. G06F 11/1451; G06F 11/1435; G06F 11/1461; G06F 11/1464; G06F 11/1469
USPC .......................................... 714/6.3
See application file for complete search history.

(56) References Cited

U.S. PATENT DOCUMENTS 9,430,331 B1 *   8/2016   Basov ..................... G06F 16/10

OTHER PUBLICATIONS

Wikipedia "incremental backup" page, retrieved from https://en.wikipedia.org/wiki/Incremental_backup (Year: 2023).*

* cited by examiner

*Primary Examiner* — Yair Leibovich
(74) *Attorney, Agent, or Firm* — IceMiller LLP (57) ABSTRACT

A folder scan system configured to identify modified folders in a storage module including a plurality of folders during an incremental backup scan is presented. The folder scan system is configured to identify modified folders using a learning-based technique. A related method is also presented.

20 Claims, 5 Drawing Sheets

FOLDER SCAN SYSTEM AND METHOD FOR INCREMENTAL BACKUP

CROSS REFERENCE TO RELATED APPLICATION

This application claims a benefit of, and priority to, India Provisional Patent Application No. 202141044665, filed Oct. 1, 2021, the contents of which is incorporated by reference in its entirety.

BACKGROUND

Embodiments of the present invention generally relate to folder scan systems and methods for incremental backups, and more particularly to learning-based folder scan systems and methods for incremental backups.

Modern businesses often rely on computer systems and computer networks. It is undesirable to experience an irretrievable loss of data in such business computer systems. To prevent loss of data, computer systems are periodically backed up. Most of the existing backup techniques face issues associated with the speed of the backup process, i.e., the time required to execute a backup. In traditional backup techniques, the data transfer rates are substantially slower than the speed of the system on which the data is stored. Such factors can substantially limit the overall speed of the backup. In addition, in some network systems, the cost of storage media for the backed-up data may also be significant.

One way to reduce transmission time for backup is performing incremental data backups. Scheduling smaller incremental backups saves time and storage space by only scanning the drives for which the files were updated since its last backup. In operation, an initial backup is performed of the entire contents of the computer system. For each subsequent backup, only those files that have changed or been created since the last backup are sent to the backup media for storing. In some systems, whether a file has changed is determined by simply comparing the date the file was created or last modified with the date of the last backup. However, in storage systems such as network-attached storage (NAS), there is no in-built technology like USN journal for Windows or change block tracking (CBT) for VMware to selectively determine the modified files for a faster and more efficient backup system.

Walking and scanning the entire file system to detect changes during incremental backups can be very expensive especially while backing up very large file systems with millions of files. Walking the file system tree and reading directory entries for all the directories can take a significant amount of time. This leads to increased backup times creating challenges with managing backup windows.

Thus, there is a need for fast, efficient, and accurate data scanning and backup techniques that would facilitate efficient backup of data without affecting storage system performance or taxing storage system resources.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a folder scan system configured to identify modified folders in a storage module including a plurality of folders during an incremental backup scan is presented. The folder scan system includes an input module, a filetype database generator, a filemod database generator, a folder inspection module, and a folder scan module. The input module is configured to receive an input including a modification time limit from a user. The filetype database generator is configured to generate a filetype database including a list of filetypes in each folder of the plurality of folders. The filemod database generator is configured to generate a file modification database including a list of filetypes modified up to a current incremental scan of the storage module and a corresponding latest modification time for each of the modified filetypes. The folder inspection module is configured to check, at the time of the incremental backup scan, for each folder of the plurality of folders if a folder contains a filetype listed in the file modification database, compare a latest modification time of a filetype to the modification time limit, if the filetype is listed in the file modification database, and identify a folder as a modified folder if the latest modification time is less than the modification time limit. The folder scan module is configured to scan the identified folder during the incremental backup scan.

According to another example embodiment, a folder scan system configured to identify modified folders in a storage module including a plurality of folders during an incremental backup scan is presented. The folder scan system further incudes a memory storing one or more processor-executable routines; and a processor communicatively coupled to the memory. The processor is configured to execute the one or more processor-executable routines to receive an input including a modification time limit from a user, generate a filetype database including a list of filetypes in each folder of the plurality of folders; generate a file modification database including a list of filetypes modified up to a last scan of the storage module and a corresponding latest modification time for each of the modified filetypes; check, at the time of the incremental backup scan, for each folder of the plurality of folders if a folder contains a filetype listed in the file modification database; compare a latest modification time of a filetype to the modification time limit, if the filetype is listed in the file modification database; identify a folder as a modified folder if the latest modification time is less than modification time limit; and scan the identified folder during the incremental backup scan.

According to another example embodiment, a method to identify modified folders in a storage module including a plurality of folders during an incremental backup scan is presented. The method includes receiving an input including a modification time limit from a user; generating a filetype database including a list of filetypes in each folder of the plurality of folders; generating a file modification database including a list of filetypes modified up to a last scan of the storage module and a corresponding latest modification time for each of the modified filetypes; checking, at the time of the incremental backup scan, for each folder of the plurality of folders if a folder contains a filetype listed in the file modification database; comparing a latest modification time of a filetype to the modification time limit, if the filetype is listed in the file modification database; identifying a folder as a modified folder if the latest modification time is less than modification time limit; and scanning the identified folder during the incremental backup.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide learning-based systems and methods to identify modified folders for incremental data backup solutions, which leads to improved performance of the incremental data backups. The term "modified folders" as used herein refers to folders that include one or more files that are added, deleted or changed.

Figure 1:
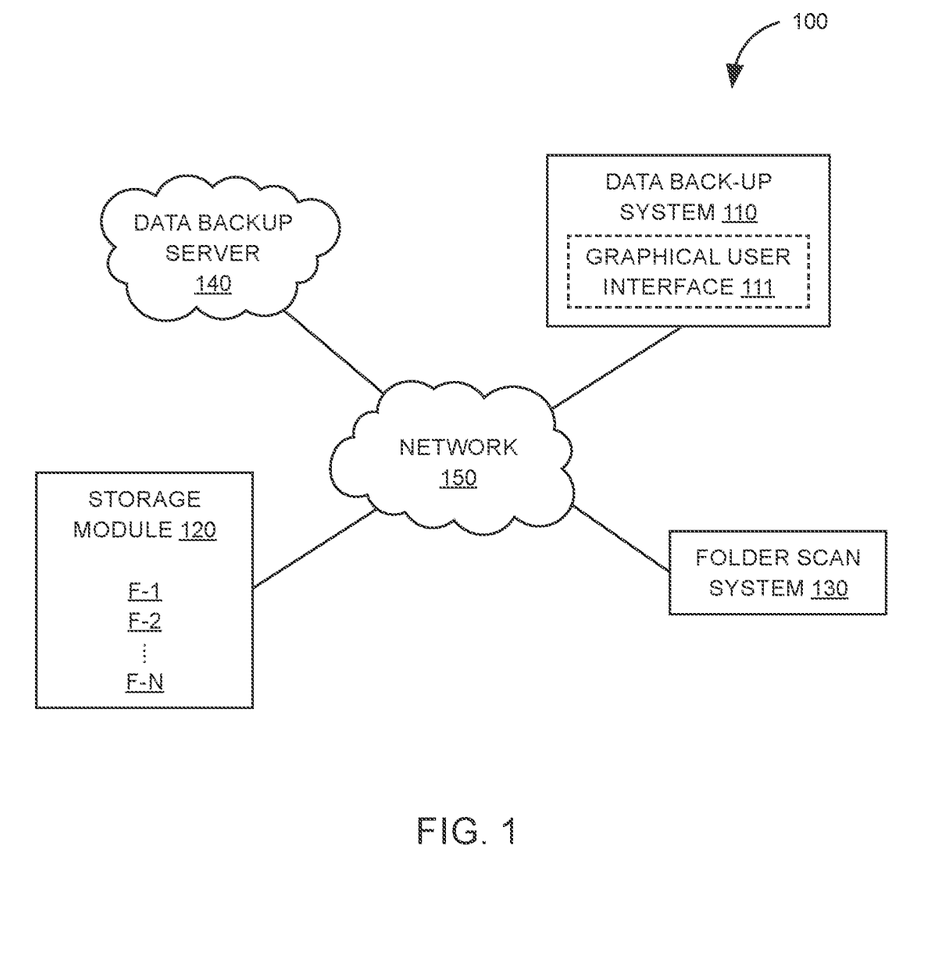
FIG. 1 is a block diagram illustrating an example data backup environment, according to some aspects of the present description.

FIG. 1 illustrates an example incremental data backup environment 100 (referred to herein as system environment 100), in accordance with embodiments of the present description. The system environment 100 includes a data backup system 110, a storage module 120, a folder scan system 130, and a data backup server 140. The system environment 100 may be configured to scan the storage module 120 using the folder scan system 130 to identify modified folders and perform incremental backup of the modified files onto the data backup server 140 using the data backup system 110.

The data backup system 110 may be a software or a hardware component that enables a client to back up and index data and optionally also search and access the backup data. In some embodiments, the data backup system 110 is a cloud-based service. The data backup system 110 may optionally further provide a graphical user interface 111 for individual clients to access data storage for cloud data management. For example, a graphical user interface 111 may be a front-end cloud storage interface. Additionally, or alternatively, the data backup system 110 may provide APIs for the access and management of files from the data storage.

The data backup system 110 may be configured to perform the full backup as well as incremental data backup. An incremental data backup is a type of backup that copies only data that was changed since the previous backup. Unlike a full backup where all the data is copied to the backup storage with every backup job, after an instance of a full backup, the incremental approach only provides for backup of files that were changed since the most recent backup. Thus, incremental backup reduces storage requirements, bandwidth load, and provides the necessary level of data consistency and availability.

The storage module 120 may be a computer data storage server having a plurality of folders such as generally represented by F-1 through F-N. The storage module 120 is configured to store data such as present in various computer systems. In an embodiment, the storage module 120 may be a network added storage (NAS) and may include data files from one or more storage drives or that may be present on various types of network-added storage devices. Such data files are organized and stored in a data file system consisting of the plurality of folders generally represented by F-1 through F-N. It should be noted that the techniques described herein may apply to a wide variety of systems with storage devices that do not include tools/APIs to track changes in the folders stored in the storage devices. In particular, the present techniques may be used for storage devices such as Network-attached Storage (NAS), Linux, and Unix operating systems.

The data present in the one or more folders of the storage module 120 may include files, directories, file system volumes, data blocks, extents, or any other hierarchies or organizations of data objects. As used herein, the term "data object" refers to (i) any file that is currently addressable by a file system or that was previously addressable by the file system (e.g., an archive file), and/or to (ii) a subset of such a file (e.g., a data block, an extent, etc.). The data present in the one or more datasets may further include structured data (e.g., database files), unstructured data (e.g., documents), and/or semi-structured data. The one or more folders of the storage module 120 further include associated metadata. Metadata generally includes information about data objects and/or characteristics associated with the data objects.

The folder scan system 130 is communicatively coupled to the storage module 120 and is configured to access the plurality of folders F-1 through F-N stored in the storage module 120. The folder scan system 130 is configured to scan and identify one or more modified folders (such as F-1 through F-N) stored in the storage module 120, as described in detail later.

The data backup server 140 may include an object-based storage, a file-based storage, or a block-based storage. In particular, the data backups server 140 may be a cloud-based storage e.g., AMAZON S3, RACKSPACE CLOUD FILES, AZURE BLOB STORAGE, or GOOGLE CLOUD STORAGE.

The various components in the system environment 100 may communicate through the network 150 and/or locally. For example, in some embodiments, one of the system components may communicate locally with the data backup system 110, while other components communicate with the data backup system 110 through the networks. In other embodiments, every component in the system environment 100 is online and communicates with each other through the network 150. In one embodiment, the network 150 uses standard communications technologies and/or protocols. Thus, the network 150 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (VIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data backup system 110, the storage module 120, the folder scan system 130, and the data backup server 140 are each represented by a single block in FIG. 1, each of these components may include multiple distributed and/or independent computers (may also be referred to as workers) working cooperatively and in parallel with other computers so that the operation of the entire system will not be affected when one or more workers are down.

As noted earlier, incremental backups may rely on modification time to detect whether a folder or file has changed since the last full or incremental backup. However, for NAS-based storage modules, the modification time for the folder doesn't change if a file within that folder is modified. The modification time for the folder only changes if a new file is added to or an existing file is deleted from the folder. Thus, a folder scan technique dependent only on the modification time might miss the files that have been modified since the last backup. However, a full scan of every folder to identify modified files results in inefficient backup and affects the backup performance. Embodiments of the present description address the noted shortcomings in the art.

Figure 2:
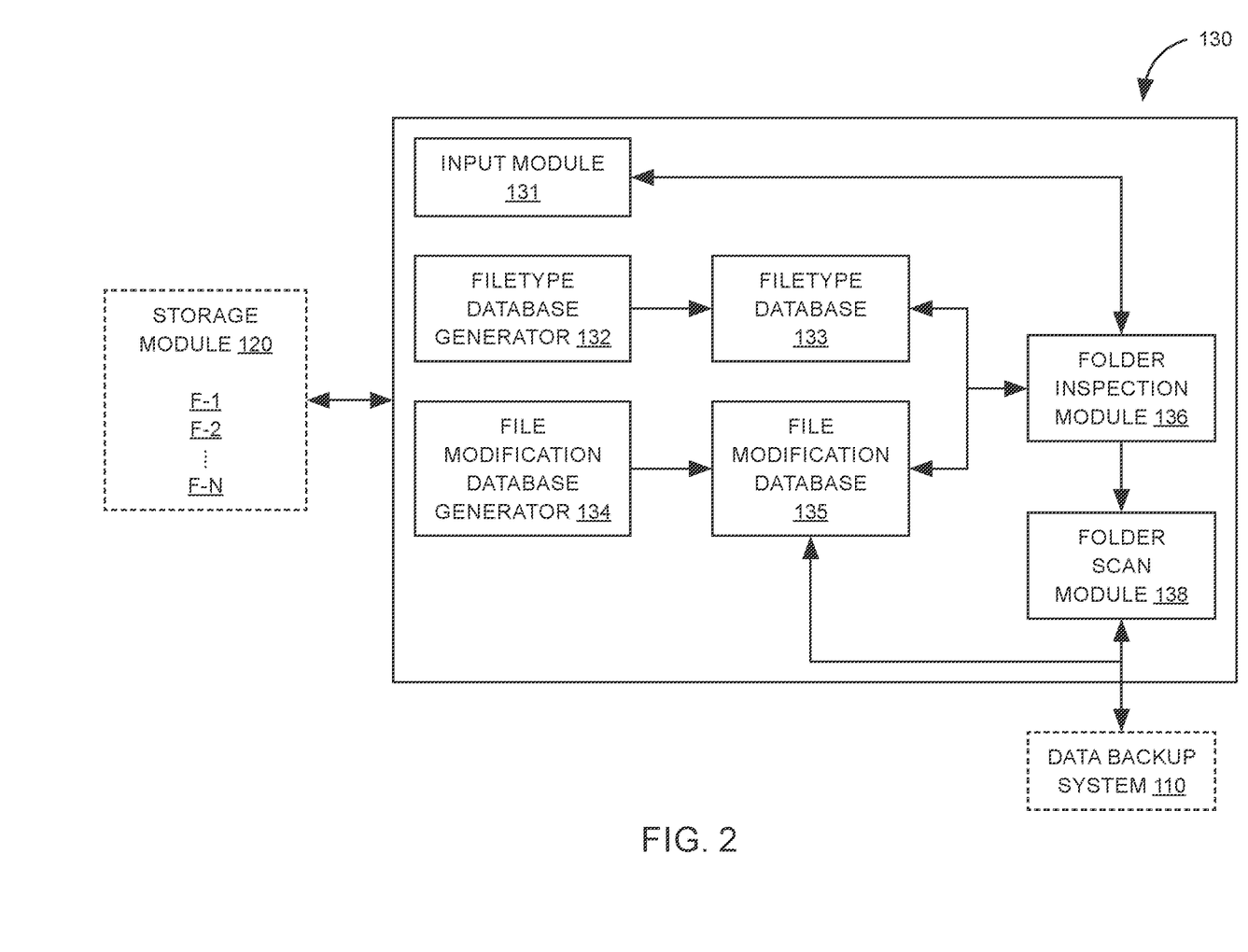
FIG. 2 is a block diagram illustrating an example folder scan system, according to some aspects of the present description.

FIG. 2 is a block diagram of an example folder scan system 130 in accordance with some embodiments of the present description. The folder scan system 130 is configured to efficiently identify modified folders in the storage module 120 during the incremental backup scan. The system 130 includes an input module 131, a filetype database generator 132, a filemod database generator 134, a folder inspection module 136, and a folder scan module 138. Each of these components is described in detail below.

The input module 131 is configured to receive an input including a modification time limit from a user. The term "modification time limit" as used herein refers to a time period during which the one or more folders should have been modified for them to be identified as modified folders by the folder inspection module 137 during the folder scan. For example, if the modification time limit is three months, then only folders that are modified within the last three months are identified as modified folders by the folder inspection module.

The filetype database generator 132 is configured to generate a filetype database 133 including a list of filetypes in each folder of the plurality of folders. The filetype database generator 132 may be configured to generate the filetype database based on the initial full scan and any subsequent scans (incremental or full) until the current incremental scan. The filetype database 133 includes the folder identifiers for each folder and file extensions present in the corresponding folder.

By a way of example, a folder may have following files:
/F-1/f1.data
/F-1/f2.data
/F-1/f3.xml
where F1 is the folder identifier and the folder F-1 includes files f1, f2 and f3 with file extensions .data, .data, and .xml respectively In this case, the filetype database 133 includes the following information
F-1⇒{.data, .xml}

The filetype database 133 may be stored by the filetype database generator 132 in the storage module 120. The filetype database 133 may be stored by the filetype database generator 132 in a memory associated with the folder scan system 130. The filetype database 133 may be stored by the filetype database generator 132 in the data backup server 140. In certain embodiments, the filetype database may be stored by the filetype database generator 132 in the storage module 120 itself.

The filemod database generator 134 is configured to generate a file modification database 135 including a list of filetypes modified up to a current incremental scan of the storage module 120 and a corresponding latest modification time for each of the modified filetypes. The filemod database generator 134 is configured to generate the file modification database 135 based on any subsequent scans (incremental or full) from the initial full scan up to the current incremental scan of the storage module 120.

For example, during a full or incremental scan, if the filemod database generator 134 finds that one or more files with ".data" extensions were modified, the filemod database generator 134 adds the following information to the file modification database 135:
{.data (lmodtime)}
Where ".data" is the file extension that has been modified and "lmodtime" contains the most recent time this file extension was modified in the storage module 120.

The filemod database generator 134 is further configured to dynamically update the file modification database 135 based on the current incremental scan and any subsequent incremental scans or full scans of the storage module 120. For example, if during the current scan or during any subsequent scans, the filemod database generator 134 finds that files with ".dbf" extensions are modified, the filemod database generator 134 adds the following information to the file modification database 135:
{.data (lmodtime), .dbf (lmodtime)}

The file modification database 135 may be stored by the filemod database generator 134 in the storage module 120. The file modification database 135 may be stored by the filemod database generator 134 in a memory associated with the folder scan system 130. The file modification database 135 may be stored by the filemod database generator 134 in the data backup server 140. In certain embodiments, the file modification database 135 may be stored by the filemod database generator 134 in the storage module 120 itself The filetype database 133 and the file modification database 135 may be stored together or separately. In one embodiment, both the filetype database 133 and the file modification database 135 may be stored as a single database. In another embodiment, the filetype database 133 and the file modification database 135 may be stored as two different databases in the same or a different location.

The folder inspection module 136 is communicatively coupled with the input module 131, the filetype database 133, and the file modification database 135. The folder inspection module 136 is configured to check, at the time of the incremental backup scan, for each folder of the plurality of folders if a folder contains a filetype listed in the file modification database 135. The folder inspection module 136 may be configured to first check the file modification database 135 for a list a filetypes listed in there and further compare the filetypes listed in the file modification database 135 against the list of filetypes for a particular folder listed in the filetype database 133.

The folder inspection module 136 is further configured to compare a latest modification time of a filetype to the modification time limit, if the filetype is listed in the file modification database 135. Thus, if a filetype listed in the file modification database 135 is found in the filetype database 133 for a folder, the folder inspection module 136 is further configured to check the latest modification time (lmodtime) for the filetype in the file modification database 135. The folder inspection module 136 is further configured to compare the lmodtime for the filetype with the modification time limit and identify a folder as a modified folder if the lmodtime is less than the modification time limit.

By way of example, a file modification database includes the following information: {.data (lmodtime), .dbf (lmodtime)} and the filetype database includes the following information for folder F-1: F-1 {.data, .xml}. The file inspection module 136 in this example is configured to check if ".data" and ".dbf" files are present in the filetype database for F-1 folder. Since ".data" file is present, the file inspection module 136 is further configured to compare the lmodtime for ".data" file with the modification time limit provided by the user. If lmodtime is less than the modification time limit, the file inspection module 136 is configured to identify the folder F-1 as a modified folder.

The folder scan module 138 is communicatively coupled to the folder inspection module 136 and configured to receive the details of the modified folder by the folder scan module 136. The folder scan module 138 is further configured to scan the identified folder during the incremental backup scan to identify any files that are modified for incremental backup. The backup system 120 (as shown in FIG. 1) is further configured to perform incremental backup of any files identified as modified by the folder scan module 138 in the data backup server 140.

In some embodiments, the folder scan module 138 is further configured to communicate the details of modified files identified during the folder scan to the file modification database generator 134 and thus update the list of filetypes and the corresponding lmodtimes in the file modification database 135. Thus, the folder scan system 130 is a self-learning-based system that allows for improved performance of a data backup along with improved accuracy.

In some embodiments, the folder scan system 130 may be further configured to identify modified folders, based on the file modification database 135, during an incremental backup scan of a dataset different from a dataset for which the file modification database is generated. In some other embodiments, the folder scan system 130 may be further configured to identify modified folders, based on the file modification database 135, during an incremental backup scan for a user different from a user for which the file modification database 135 is generated.

Figure 3:
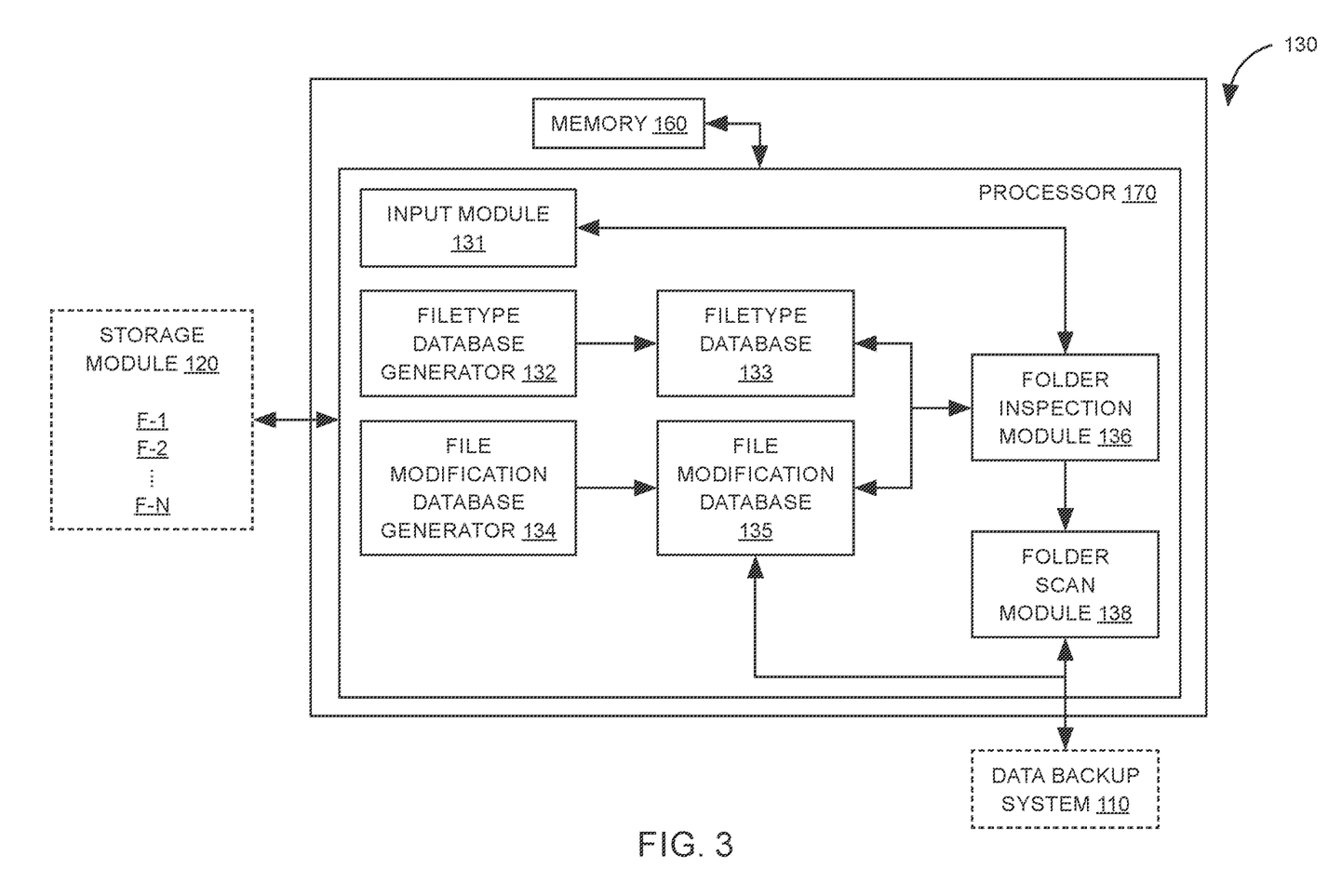
FIG. 3 is a block diagram illustrating an example folder scan system, according to some aspects of the present description.

Referring now to FIG. 3, a system 130 configured to efficiently identify modified folders in the storage module 120 during an incremental backup scan is presented. The storage module 120 includes a plurality of folders. The system 130 includes a memory 160 storing one or more processor-executable routines, and a processor 170. The processor 170 includes an input module 132, a filetype database generator 132, a filemod database generator 134, a folder inspection module 136, and a folder scan module 138. Each of these components is described in detail earlier. The processor 170 is further configured to execute the processor-executable routines to perform the steps illustrated in the flow-chart of FIG. 4.

Figure 4:
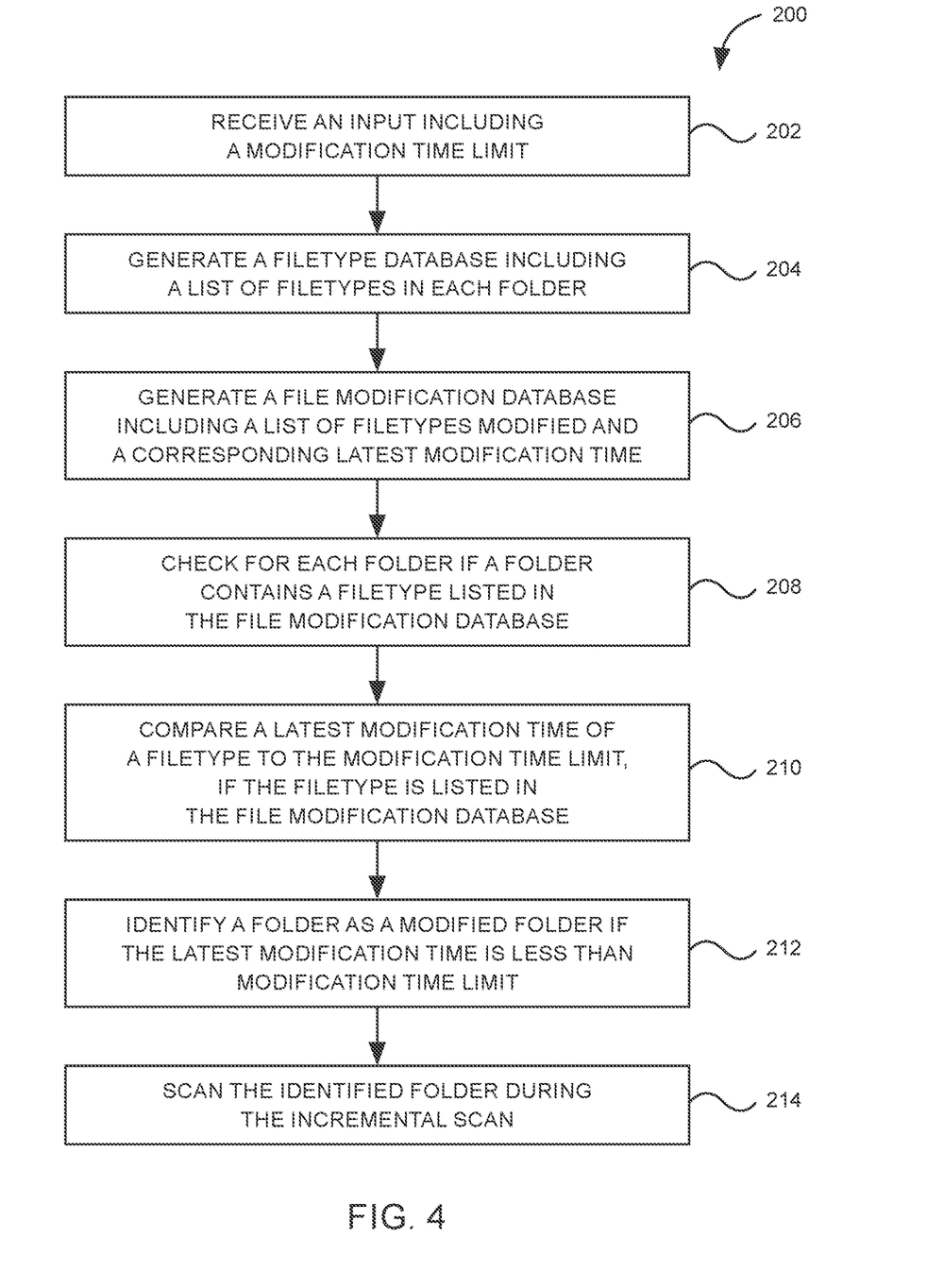
FIG. 4 is a flow chart illustrating an example folders scan method for incremental backup, according to some aspects of the present description.

FIG. 4 is a flowchart illustrating a method 200 for efficiently identify modified folders in a storage module 120 during an incremental backup scan. The storage module 120 includes a plurality of folders. The method 200 may be implemented using the folder scan system 130 of FIGS. 2 and 3, according to some aspects of the present description. Each step of the method 200 is described in detail below.

The method 200 includes, at block 202, receiving an input including a modification time limit from a user. The term "modification limit" has been defined herein earlier. The method 200 further includes, at block 204, generating a filetype database including a list of filetypes in each folder of the plurality of folders. The filetype database may be generated based on the initial full scan and any subsequent scans (incremental or full) until the current incremental scan. The filetype database includes the folder identifiers for each folder and file extensions present in the corresponding folder. The filetype database may be stored in the storage module, in a memory associated with the folder scan system, or in the data backup server.

At block 206, the method 200 includes generating a file modification database including a list of filetypes modified up to a last scan of the storage module and a corresponding latest modification time for each of the modified filetypes. The file modification database may be generated based on any subsequent scans (incremental or full) from the initial full scan up to the current incremental scan of the storage module.

The method 200 may further include dynamically updating the file modification database based on the current incremental scan and any subsequent incremental scans or full scans of the storage module. The file modification database may be stored in the storage module, in a memory associated with the folder scan system, or in the data backup server.

The method 200 further includes, at block 208 checking, at the time of the incremental backup scan, for each folder of the plurality of folders, if a folder contains a filetype listed in the file modification database. Block 208 may include first checking the file modification database for a list a filetypes listed in there, and further comparing the filetypes listed in the file modification database against the list of filetypes for a particular folder listed in the filetype database.

At block 210, the method 200 includes comparing a latest modification time of a filetype to the modification time limit, if the filetype is listed in the file modification database. Thus, if a filetype listed in the file modification database is found in the filetype database for a folder, the method 200 includes checking the latest modification time (lmodtime) for the filetype in the file modification database. The method 200 further includes comparing the lmodtime for the filetype with the modification time limit and identifying a folder as a modified folder if the lmodtime is less than the modification time limit.

The method 200 further includes, at block 212, identifying a folder as a modified folder if the latest modification time is less than the modification time limit. At block 214, the method 200 includes scanning the identified folder during the incremental backup to identify any files that are modified for incremental backup. In some embodiments, the method 200 further includes performing incremental backup of any files identified as modified in the data backup server.

In some embodiments, the method 200 further includes updating the list of filetypes and the corresponding lmodtimes in the file modification database based on the files identified as modified during the folder scan. Thus, the method 200 is a self-learning-based method that allows for improved performance of a data backup along with improved accuracy.

In some embodiments, the method 200 further includes identifying modified folders, based on the file modification database, during an incremental backup scan of a dataset different from a dataset for which the file modification database is generated. In some embodiments, the method 200 further includes identifying modified folders, based on the file modification database, during an incremental backup scan for a user different from a user for which the file modification database is generated.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 5:
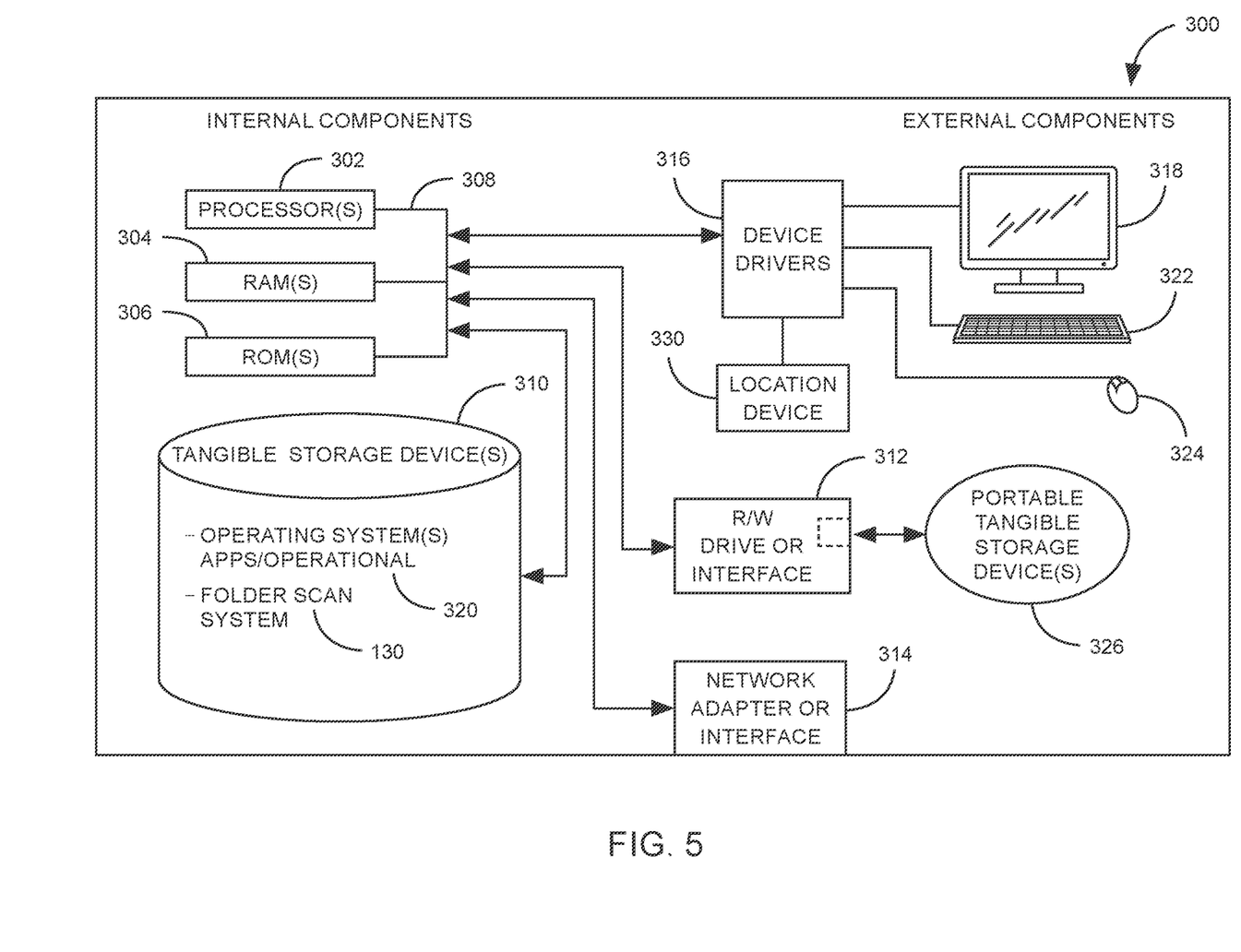
FIG. 5 is a block diagram illustrating an example computer system, according to some aspects of the present description.

One example of a computing system 300 is described below in FIG. 5. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the folder scan system 130. Both, the operating system 320 and folder scan system 130 are executed by processor 302 via one or more respective RAMs 304 (which typically includes cache memory). The execution of the operating system 320 and/or the system 130 by the processor 302, configures the processor 302 as a special-purpose processor configured to carry out the functionalities of the operation system 320 and/or the folder scan system 130, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the folder scan system 130 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:
1. A computer-implemented system comprising:
a processor; and
a memory storing a plurality of executable instructions that, when executed by the processor, cause the system to:
identify modified folders during an incremental backup scan;
receive an input comprising a modification time limit from a user;
generate a filetype database comprising a list of filetypes in each folder of a plurality of folders of a storage;
generate a file modification database comprising a list of filetypes modified and a corresponding latest modification time for each of the modified filetypes;
check, at one or more times of the incremental backup scan, whether each folder of the plurality of folders of the storage contains a filetype listed in the file modification database,
after a filetype is checked as being listed in the file modification database, compare a latest modification time thereof to the modification time limit,
identify one or more folders as a modified folder(s) if the latest modification time is less than the modification time limit; and scan the identified folder during the incremental backup scan.

2. The system of claim 1, wherein the file modification database is generated based on a first full scan and any subsequent scans up to a current incremental scan.

3. The system of claim 2, wherein the file modification database is dynamically updated based on the current incremental scan and any subsequent incremental scans or full scans.

4. The system of claim 3, being further configured to update the file modification database based on an identification of one or more modified files during the folder scan of the identified folder.

5. The system of claim 1, wherein the file modification database is stored with the modified folders.

6. The system of claim 1, wherein at least one of the storage folders is performed via a network added storage.

7. The system of claim 1, being further configured to identify modified folders, based on the file modification database, during an incremental backup scan of a dataset different from a dataset for which the file modification database is generated.

8. The system of claim 1, being further configured to identify modified folders, based on the file modification database, during an incremental backup scan for a user different from a user for which the file modification database is generated.

9. A folder scan system configured to identify modified folders in a storage module comprising a plurality of folders during an incremental backup scan, the folder scan system comprising:
an input module configured to receive an input comprising a modification time limit from a user;
a memory storing one or more processor-executable routines; and
a processor communicatively coupled to the memory, the processor configured to execute the one or more processor-executable routines to:
generate a filetype database comprising a list of filetypes in each folder of the plurality of folders;
generate a file modification database comprising a list of filetypes modified and a corresponding latest modification time for each of the modified filetypes;
check, at one or more times of the incremental backup scan, whether each folder of the plurality of folders contains a filetype listed in the file modification database;
after a filetype is checked as being listed in the file modification database, compare a latest modification time thereof to the modification time limit;
identify a folder as a modified folder if the latest modification time is less than modification time limit; and
scan the identified folder during the incremental backup scan.

10. The folder scan system of claim 9, wherein the processor is configured to execute the one or more processor-executable routines to generate the file modification database based on a first full scan of the storage module and any subsequent scans up to a current incremental scan.

11. The folder scan system of claim 10, wherein the processor is further configured to execute the one or more processor-executable routines to dynamically update the file modification database based on the current incremental scan and any subsequent incremental scans or full scans of the storage module.

12. The folder scan system of claim 9, wherein the storage module comprises a network added storage.

13. A method to identify modified folders in a storage module comprising a plurality of folders during an incremental backup scan, the method comprising:
receiving an input comprising a modification time limit from a user;
generating a filetype database comprising a list of filetypes in each folder of the plurality of folders;
generating a file modification database comprising a list of filetypes modified and a corresponding latest modification time for each of the modified filetypes;
checking, at one or more times of the incremental backup scan, whether each folder of the plurality of folders contains a filetype listed in the file modification database;
after a filetype is checked as being listed in the file modification database, comparing a latest modification time thereof to the modification time limit;
identifying a folder as a modified folder if the latest modification time is less than modification time limit and
scanning the identified folder during the incremental backup scan.

14. The method of claim 13, wherein the file modification database is generated based on a first full scan of the storage module and any subsequent scans up to a current incremental scan.

15. The method of claim 14, further comprising dynamically updating the file modification database based on the current incremental scan and any subsequent incremental scans or full scans of the storage module.

16. The method of claim 15, further comprising updating the file modification database based on one or more modified files identified during the folder scan of the identified folder.

17. The method of claim 13, further comprising storing the file modification database in the storage module.

18. The method of claim 13, wherein the storage module comprises a network added storage.

19. The method of claim 13, further comprising identifying modified folders, based on the file modification database, during an incremental backup scan of a dataset different from a dataset for which the file modification database is generated.

20. The method of claim 13, further comprising identifying modified folders, based on the file modification database, during an incremental backup scan for a user different from a user for which the file modification database is generated.

* * * * *